(12) United States Patent
Pressler

(10) Patent No.: US 6,705,736 B1
(45) Date of Patent: Mar. 16, 2004

(54) LIGHT-COLLECTION DEVICE

(75) Inventor: David E. Pressler, 724 Broadmore Estates, Goshen, IN (US) 46528

(73) Assignees: David E. Pressler, Goshen, IN (US); Richard C. Boling, Elkhart, IN (US)

( * ) Notice: Subject to any disclaimer, the term of this patent is extended or adjusted under 35 U.S.C. 154(b) by 72 days.

(21) Appl. No.: 10/004,899

(22) Filed: Dec. 3, 2001

(51) Int. Cl.⁷ .................................................. G02B 5/10
(52) U.S. Cl. ...................................... 359/853; 359/858
(58) Field of Search ................................. 359/364, 365, 359/366, 599, 857, 858, 859, 894

(56) References Cited

U.S. PATENT DOCUMENTS

| 4,325,612 A | 4/1982 | Clegg |
| 4,333,713 A | 6/1982 | Clegg |
| 4,572,621 A | 2/1986 | Clegg |
| 4,575,196 A | 3/1986 | Clegg |
| 4,575,197 A | 3/1986 | Clegg |
| 4,577,936 A | 3/1986 | Clegg |
| 4,603,949 A | 8/1986 | Clegg |
| 4,609,261 A | 9/1986 | Clegg |
| 4,621,907 A | 11/1986 | Clegg |
| 4,657,353 A | 4/1987 | Clegg |
| 5,042,931 A | 8/1991 | Mourier |
| 5,327,287 A | * 7/1994 | Atchley ...................... 359/599 |
| 5,604,782 A | 2/1997 | Cash, Jr. |
| 6,118,579 A | * 9/2000 | Endemann .................. 359/366 |

* cited by examiner

Primary Examiner—Euncha Cherry
(74) Attorney, Agent, or Firm—Baker & Daniels

(57) ABSTRACT

A light-gathering device for concentrating light. The light-gathering device may be used as a stand-alone telescope or as an attachment to a standard telescope. When used as an attachment to a standard telescope, the light-gathering device increases the effective aperture size of the telescope. The light-gathering device is comprised of two conical sections with highly polished mirrored surfaces. The larger of the two conical sections is orientated such that the large end faces toward the object to be viewed. Light enters the area between the two conical sections and is condensed within the sections until it exits from the device in a more concentrated form.

20 Claims, 6 Drawing Sheets

LIGHT-COLLECTION DEVICE

BACKGROUND OF THE INVENTION

This invention relates to a light collection device for use with a telescope. In particular, the invention can significantly increase the light collecting capability of a standard telescope, or in certain embodiments may function as a stand alone telescope.

The telescope has had an enormous impact on man's understanding of the nature and working of the universe. Two general types on telescopes are used by mankind, those used for collecting visible light and those utilized for the collection of x-ray emissions. Regardless of type, x-rays or light rays are gathered and concentrated by the telescope in an effort to analyze what is collected.

The present invention is directed primarily towards optical (light gathering), ultraviolet, and near-infrared telescopes of which there are two primary varieties, the refractor and the reflector. A refractor telescope uses a series of lenses to refract or bend light and concentrate it as it enters through the front aperture of the telescope. On the other hand, the reflector telescope uses a combination of mirrors to collect a large amount of light and focus it so that the light may be seen by the naked eye or recorded by photograph.

The ability of either type (refractor or reflector) of telescope to detect and distinguish distant celestial bodies is dependent upon two important properties of the telescope. The first property is the telescope's ability to collect and gather light. The light collecting ability is related directly to the size of the light entry aperture, or diameter of the telescope. In general, the larger the aperture, the greater the telescope's ability to gather light. The more light gathered and brought into focus by the telescope, the more distinguishable the final image will be.

The second important property of a telescope is its ability to magnify the collected light. The measure of a telescope's ability to enlarge an image is called magnification. The magnification of a telescope is dependent upon the types of lenses used in the telescope, with the eyepiece generally being the most important. The eyepiece allows the gathered light to be viewed by the observer's eye. Since magnification can be varied on almost any telescope through the use of different eyepieces, a telescope's ability to view and distinguish distant objects is; normally more dependent upon its light collecting ability rather than its magnification.

The first telescopes developed by man were of the refractor variety. These telescopes gather light through an objective lens (aperture), focus the light to a focal point, and then magnify the light with an eyepiece. Although effective, the objective lens (and hence the light collecting ability) of refractor telescopes are typically limited to a diameter of four inches or less. Refractor telescopes with large lenses tend to exhibit chromatic aberration, which is the appearance of a rainbow halo around the viewed image. Although different types of corrective lenses are available to correct chromatic aberration, the aberration increases as the objective lens gets larger. Additionally, the cost for manufacturing objective type lenses with diameters exceeding four inches increases significantly. Therefore, for the reasons stated above, the cost per unit of aperture for a refractor telescope becomes much greater than for a reflector telescope once the aperture reaches four inches in diameter.

Isaac Newton developed the reflective telescope in roughly 1680. A reflector telescope uses a curved mirror (also known as a primary mirror) to gather and reflect light to a focal point located in front of the mirror. A second flat mirror (known as the auxiliary mirror) then reflects the light through the side of the telescope to a magnifying eyepiece. Another type of reflector telescope is the Cassegrain design. A Cassegrain telescope also utilizes primary and auxiliary mirrors, but the primary mirror has a central hole, and the auxiliary mirror has a convex shape. The convex auxiliary mirror reflects the collected light reflected from the primary mirror back along the axis of the telescope and through the hole in the primary mirror. The most well known example of a Cassegrain telescope is the Hubble Space Telescope.

Although overall they are relatively cost effective, reflector telescopes tend to suffer from a drawback known as "spherical aberration," which is when the light reflected from the primary mirror's edge is focused to a slightly different point than the light reflected from the center. This causes a visual distortion near the edge of the viewed image causing the image to become elongated near the edge of the visual field. This leads to numerous visual problems, including the problem of stars appearing as if they are comets.

In an effort to correct spherical aberration in reflector telescopes, a hybrid telescope called the compound or the catadioptric telescope was developed. Compound telescopes have a primary mirror located at thie back of the telescope with a glass corrector plate located near the front of the telescope close to the aperture. The corrector plate bends the collected light in an effort to correct spherical aberration so that it all meets at the focal point. One of the most popular types of compound telescopes is known as the Schmidt-Cassegrain telescope. In a Schmidt-Cassegrain telescope, the light rays travel through the aperture and the corrector plate, reflect off of the primary mirror to the auxiliary mirror, and then bounce off the auxiliary mirror through a small hole in the center of the primary mirror, where the light rays are magnified by the eyepiece.

One major drawback with telescopes of the Schmidt-Cassegrain design is the difficulty in producing corrector plates able to correct spherical aberration for large primary mirrors. The larger the primary mirror, the more complex the curvature for the large corrective plate. This increases the difficulty in manufacturing the corrector plate and consequently increases the cost of the telescope. The employment of a corrector plate also increases the overall length of the compound telescope so that it is about twice the length of a traditional reflector telescope with the same focal length.

A second problem with compound telescopes has to do with the difficulty in producing the primary mirror. As the size of the primary mirror increases, the difficulty in achieving the proper curvature and surface polish also increases. Additionally, the thickness of the primary mirror and its mass must increase in order for the mirror to be rigid enough to hold the proper curvature. Very large primary mirrors present difficulties in transportation. In addition, large primary mirrors also can form temperature gradients which may distort the viewing of the reflected image.

SUMMARY OF THE INVENTION

The invention disclosed herein is designed to increase the effectiveness of the many different types of telescopes by increasing the amount of light the telescope collects and gathers. In one embodiment of the present invention, a light collection device includes two partial conical surfaces, the first being smaller and located within the second. The partial conical surfaces are generally shaped as a frustum of a cone, being widest at the base and more narrow toward the end where the apex of the cone would be located. The two frustums differ in size, with the inner surface of the larger frustum being highly polished and the outer surface of the smaller frustum being highly polished, both highly polished surfaces being reflective enough to reflect light and electromagnetic rays.

In one embodiment, the invention utilizes right circular cones or frustums. If the inner surface of such a cone or frustum is a reflecting surface, all rays, parallel to the axis thereof, that enter the cone through the base are reflected toward and perpendicular to the central axis of the cone. Similarly, any rays projected perpendicularly toward the axis of a right circular cone will reflect off a polished outer surface and travel in a direction parallel to the central axis. Consequently, two concentric frustum, one within the other, with an inner reflective surface on the outer frustum and an outer reflective surface on the inner frustum that are substantially parallel and orientated such that the reflective surfaces face each other, will "funnel" any rays entering the base of the frustum. Light rays entering the base and traveling parallel to the central axis will be concentrated, exiting the apex of the outer frustum in a direction parallel to the central axis. In other words, light may be collected at the frustums base end and condensed near the opposite end.

Based upon the conical property explained above, if two differently sized frustums can be supported so that the walls of the frustum are held concentric and parallel and mounted to the front of a telescope, the amount of light gathered by the telescope is greatly increased. Hence, through this light funneling technique, the effective area of the aperture is increased. Consequently, the light-gathering device may be used by amateur and professional astronomers alike to increase the power of their telescopes, allowing a cost effective means of viewing distant stars: and galaxies. Larger scale light-gathering devices of this type may also be used to economically increase the light gathered by telescopes in earth observatories or in space based telescopes.

It is believed that frustum pieces may best be machined through either a diamond milling process or a lathing process. The frustum can be spun while the cutting tool remains fixed, allowing the mirror surfaces to be brought near the final reflective tolerance before a final polishing takes place. The same cutting frame set up may be used in the final polishing steps by replacing the cutting tool with pitch tools.

Another aspect of this invention relates to the strength and rigidity offered by the dual frustum assembly. The frustum shape is inherently sturdy and the rigidity may be increased by using braces and supports. Accordingly, a thin layer of polished glass material may be used to increase the reflective properties of the frustum, thereby increasing the effectiveness of the light gathering. The rigidity of the structure helps maintain the integrity of the layer of glass. In another embodiment, both frustums may also be constructed entirely of low expansion glass. The back side of an all glass mirror can be hollowed out by the use of a traditional honeycomb pattern, which reduces the mass.

In yet another embodiment, the dual frustum light-gathering device functions as a traditional stand alone telescope by using a parabolic lens coating or parabolic cylinder reflecting shape on the inner frustum. The parabolic lens coating reflects light in a direction to a focal point where all the light beams converge, rather than parallel to the central axis of the frustum. Using an eyepiece, the operator of the telescope can then magnify the image gathered, allowing the image to be viewed by the user. In another embodiment of the invention, a parabolic covered inner frustum is inverted, and a auxiliary mirror is used to direct the light rays in a manner that allows the light-gathering device to function as a stand-alone telescope-with a shorter overall length. In still another embodiment, the overall length of the light-gathering device is decreased through the use an inverted inner frustum and a parabolic auxiliary mirror.

DETAILED DESCRIPTION OF SEVERAL EMBODIMENTS OF THE INVENTION

The embodiments of the invention described herein are not intended to be exhaustive or to limit the precise forms disclosed. Rather, the embodiments selected for description have been chosen to give representative samples of the invention and enable one skilled in the art to practice the invention.

Figure 1:
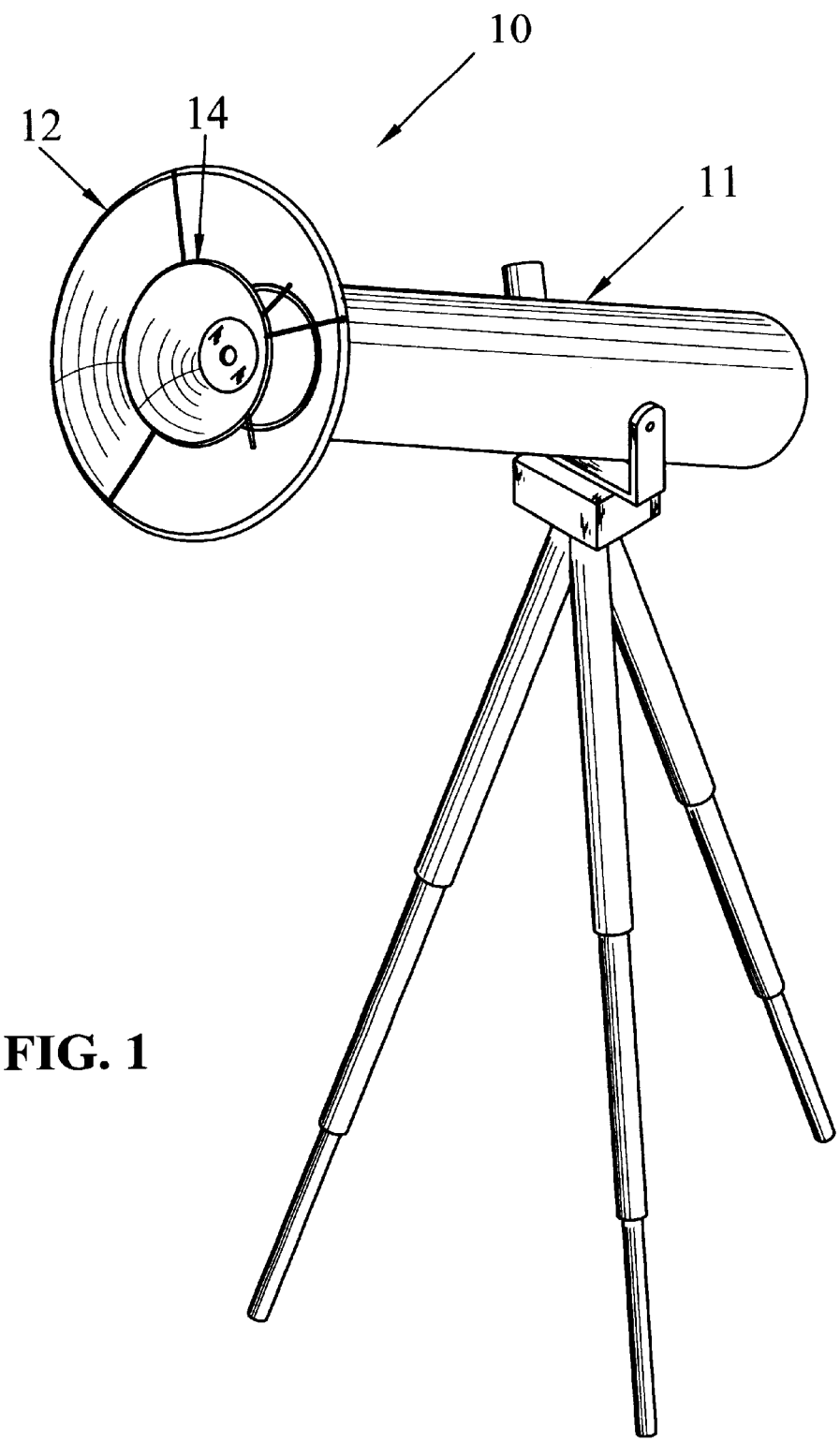
FIG. 1 is a perspective view of,one embodiment of a light-gathering device shown in combination with a standard reflecting telescope.
Figure 2:
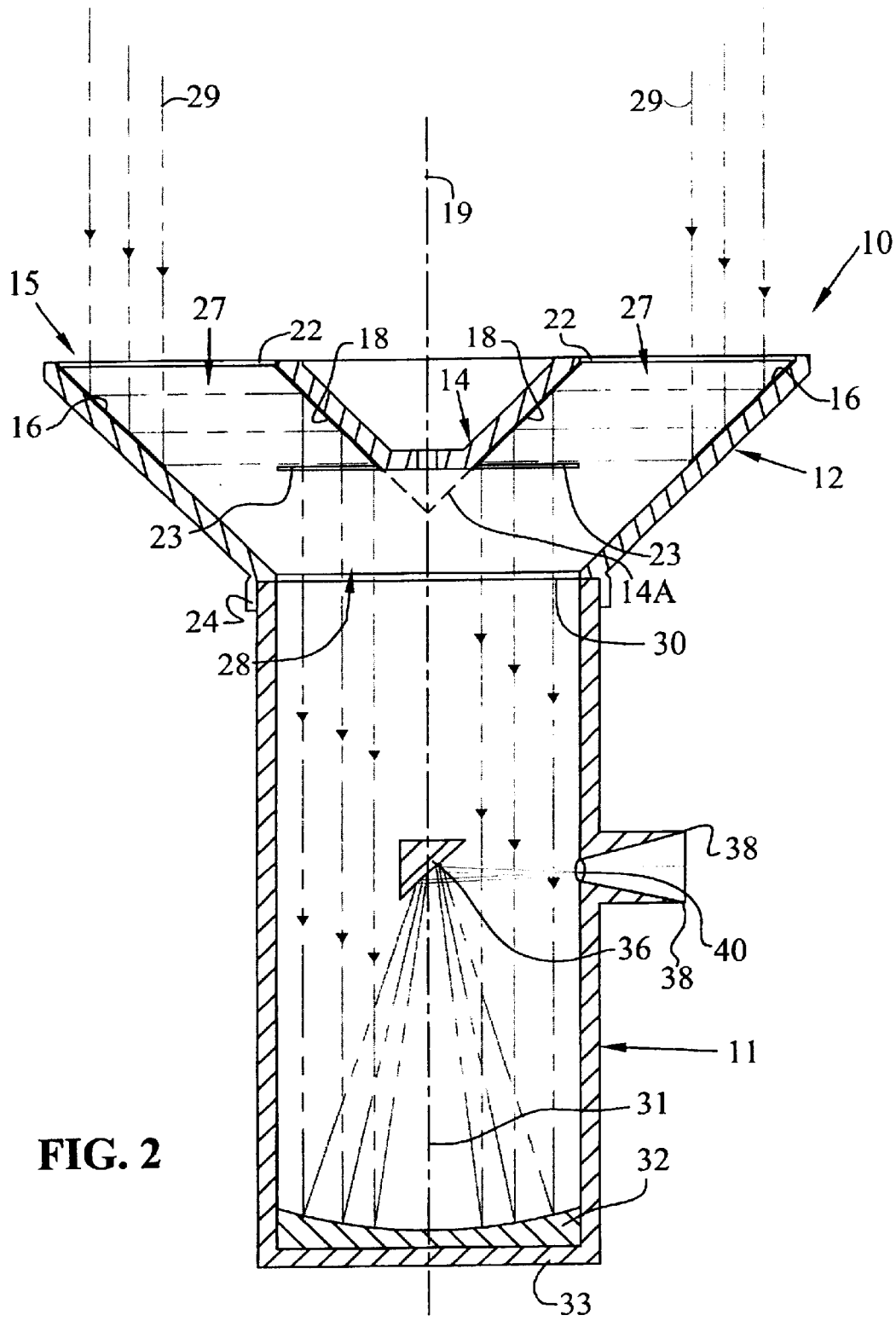
FIG. 2 is a cross section of the embodiment of FIG. 1.
Figure 3:
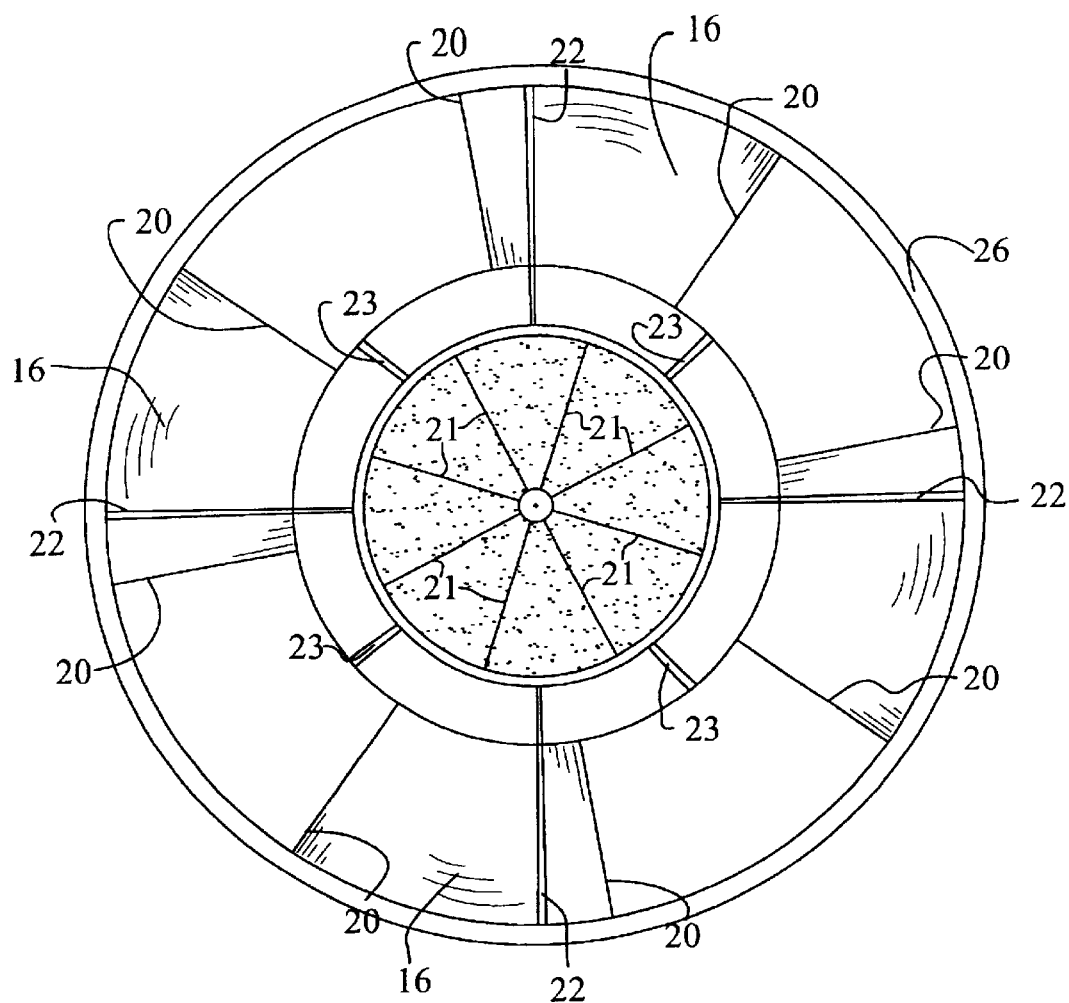
FIG. 3 is a top view of the embodiment shown in FIG. 1.

Referring now to the drawings, in FIGS. 1–3, one embodiment of a light-gathering device generally indicated by the numeral 10 is shown attached to telescope generally indicated as 11. Light-gathering device 10 includes an outer reflecting frustum generally indicated as 12, an inner reflecting frustum generally indicated as 14, and a frame generally indicated as 15. Inner reflecting frustum 14 may also be extended to a complete cone 14a as shown with phantom lines in FIG. 2.

In this embodiment, the outer reflecting frustum 12 has an inner reflecting surface 16, and inner reflecting frustum 14 has an outer reflecting surface 18, both of the reflecting surfaces are set at a 45° incline. Both of the frustums are aligned along a common axis 19. As best shown in FIG. 3, frustums 12 and 14 may also include a plurality of optional sectioning lines 20 and 21, respectively, for sectioning the frustums into sections for ease of transportation and re-assembly at a chosen location.

The inner reflecting frustum 14 and the outer reflecting frustum 12 may be connected to one another and telescope 11 by frame 15. Frame 15 includes upper connecting rods 22, lower connecting rods 23, a mounting portion 24, and an outer portion 26. The connecting rods 22, 23 hold the inner reflecting frustum 14 in place within the outer reflecting frustum 12, while assuring the reflecting surfaces 16, 18 of the reflecting frustums 12, 14 remain substantially parallel. As held by frame 15, the frustums 12, 14 form an outer light collecting opening 27 and a funneling opening 28. Outer light collecting opening 27 is formed in the area between the bases of outer reflecting frustum 12 and the inner reflecting frustum 14 for receipt of light rays 29. Funneling opening 28 is located at the apex of outer frustum 12 and serves as a gateway for light rays 29 to enter telescope 11.

Telescope 11, which is of a type well known in the art, has an aperture 30 and a central axis 31 aligned with central axis 19 of light-gathering device 10. Telescope 11 also has a primary parabolic mirror 32 at a base end 33 opposite aperture 30 and an auxiliary mirror 36 centrally located in the telescope. Telescope 11 further includes an eyepiece 38 having a magnifying lens 40.

In manufacturing light-gathering device 10, inner and outer reflecting surfaces 16, 18 are generally polished and mirrored in order to reflect as much entering light as possible. It should be noted that surface 16 need not be polished below the bottom of inner frustum 14, in this embodiment, as any light rays striking below this point will not be funneled into telescope 11. To facilitate the reflection of light reflecting surfaces 16, 18 and to help maintain the surface integrity, the reflecting surfaces 16, 18 may be coated with a relatively thin coat of low thermal expansion glass material if the frustums are made from polished metal. In addition, the frustums 12, 14 may be made from a low thermal expansion honeycombed glass material with a metal backing to increase the rigidity of the frustums.

The sectioning of the frustums 12, 14 may be done in a manner consistent with that known in the art, preferably after the polishing of the inner reflecting surface 16 and outer reflecting surface 18. Of course, the sections may also be manufactured independently from one another, but this presents additional considerations in trying to maintain a uniform polish. The sectioning of the frustums 12, 14 allows for easier transportation of the light-gathering device 10. This may be of particular advantage where transportation size is of the essence, such as that for an outer space application. When sectioned, the frustum sections may then be transported by a plurality of vehicles, or conversely, one vehicle may make a plurality of trips to move the frustums from one location to another, where the frustums may be reassembled and realigned.

In the present embodiment, a 45° angle is formed between the central axis 19 and both the inner reflective surface 16 and the outer reflective surface 18. Therefore, any rays traveling in a direction substantially parallel to the axis of a cone that comes into contact with the 45° inner surface will be reflected substantially perpendicular to the axis. Furthermore, any rays traveling perpendicularly toward the axis will reflect off the outer reflective surface toward the peak of the cone or frustum in a direction substantially parallel with the axis.

Due to the above-mentioned properties of conical surfaces, the polishing of the frustums in this embodiment is completed in a manner such that the surface is flat and without a parabolic curvature. Reflecting telescopes require a parabolic or spherical mirror with a curvature that is more complex to polish. It is believed the use of frustums having cross sections with a linear reflecting surface in the present embodiment makes the polishing of the surfaces of the frustums much easier than that required for a standard reflecting telescope.

In addition to the ease of the polishing, the flat reflecting surfaces 16, 18 allow that the frustums 12, 14 may be relatively thin. The utilization of thin frustums 12, 14 reduces the weight of the individual frustums 12, 14 and the light-gathering device 10 as a whole. Reduced weight is very important when considering light-gathering devices 10 of large magnitudes, such as those that may be utilized in outer space, where overall weight is an important concern.

A light-gathering device 10 using a two-frustum design has an advantage over the traditional reflecting telescope because the size of the primary mirror may be decreased relative to the effective aperture. Conversely, the effective aperture size is increased for a given primary mirror when the light-gathering device is used.

In operation, light rays 29 enter outer light collecting opening 27 between the two reflecting frustums 12, 14 in a direction substantially parallel to the central axis 19 of both the reflecting frustums 12, 14. The above-mentioned properties relating to right angled cones ensure light rays 29 entering through the outer light collecting opening 27 will be funneled through the light-gathering device 10, with the light being concentrated as it leaves funneling exit opening 28. The light-gathering device 10 successfully funnels the light rays 29 for the reason that any light rays entering the external opening 27 parallel to axis 19 will then reflect off inner reflecting surface 16 of outer frustum 12 toward the central axis 19 in a substantially perpendicular manner. Then, as outer reflective surface 18 of inner frustum 14 is parallel to inner reflective surface 16 and set a 45° degree angle to the axis, the light rays 29 will reflect as described above and travel away from outer reflective surface 18 in a direction parallel to central axis 19.

The light rays 29 will depart light-gathering device 10 through funneling opening 28 and continue through aperture 30 of telescope 11 traveling in a direction substantially parallel to the central axis 19. The light-gathering device is aligned with telescope 11 such that the central axis 31 of the telescope 11 matches the central axis 19 of the light-gathering device 10. Consequently, light traveling parallel to the central axis 19 of the frustums 12, 14 is traveling substantially parallel to the central axis 31 of the telescope 11, effectively taking the same path as light normally entering the telescope 11 if the light-gathering device 10 was not in place. The light rays 29 travel the length of the telescope 11 and reflect off of the primary parabolic mirror 32 and begin to converge. The converging light rays 29 then reflect off of a auxiliary mirror 36, through an eyepiece 38. The eyepiece 38 is equipped with a magnifying lens 40 capable of enlarging the image of the light rays 29 such that a human eye can distinguish the visual display.

It should be noted that light rays approaching the central portion of light-gathering device 10 will be blocked from being funneled through the device and exiting funneling opening 28. The amount of the light rays being blocked will coincide with the diameter of the base of inner frustum 14. Nonetheless, based upon the significantly greater diameter of the outer frustum 12 as compared to aperture 30, the total amount of light funneled into telescope 11 can be greatly increased from what would normally be received through aperture 30 without light-gathering device 10.

Figure 4:
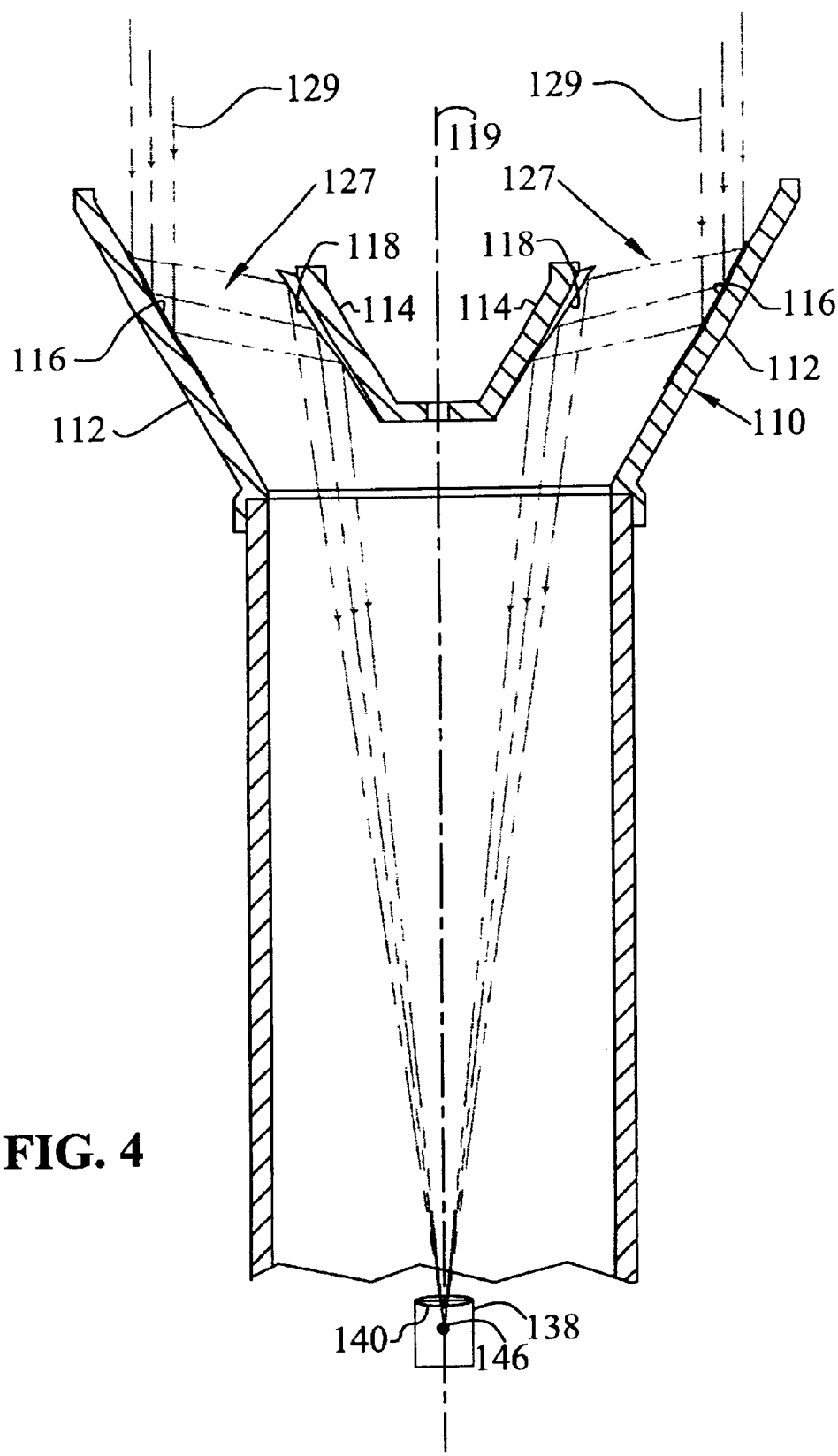
FIG. 4 is a cross section of another embodiment of the invention including parabolic mirrors for use as a self-standing telescope.

Referring now to FIG. 4, an alternate embodiment light-gathering device 110 is shown as a stand-alone telescopic device without need for a traditional telescope. Similar to the previously disclosed embodiment, this embodiment is composed of an outer frustum 112 and an inner frustum 114 arranged such that the walls of the frustum are substantially parallel. For simplicity, the connecting frame is not shown in this embodiment. Light-gathering device 110 includes an inner reflective surface 116 and an outer reflective surface 118 that are also polished and mirrored, or made of glass with a metallic backing; however, the inner frustum 114 is not a right angle cone, hence the principles explained for the previous embodiment will not apply. The frustums are aligned along a common axis 119. Light-gathering device 110 also includes an external opening 127 for receipt of light rays 129, and an eyepiece 138 having a magnifying lens 140 for magnifying light rays 129 converging towards a focal point 146.

Outer surface 118 of this embodiment is a parabolic conical or frustum-shaped mirror. Light rays 129 entering the light-gathering device 110 through the external opening 127 reflect off the inner reflecting surface 116 toward the outer reflecting surface 118 of the inner frustum 114. The light rays 129 do not travel toward the inner frustum 114 at a path perpendicular to the central axis 119 because the inner reflecting surface is not at a right angle. The light rays 129 are then reflected from parabolic mirror 118 and are focused to focal point 146. Near focal point 146 is eyepiece 138 with magnifying lens 140 such that the light gathered could be magnified as is well known in the art for viewing by the human eye. Also, use of a camera or some type of visual recording equipment, i.e., a CCD-charge coupled device, may be placed at the focal point 146 in an effort to utilize the device's light-gathering ability.

Figure 5:
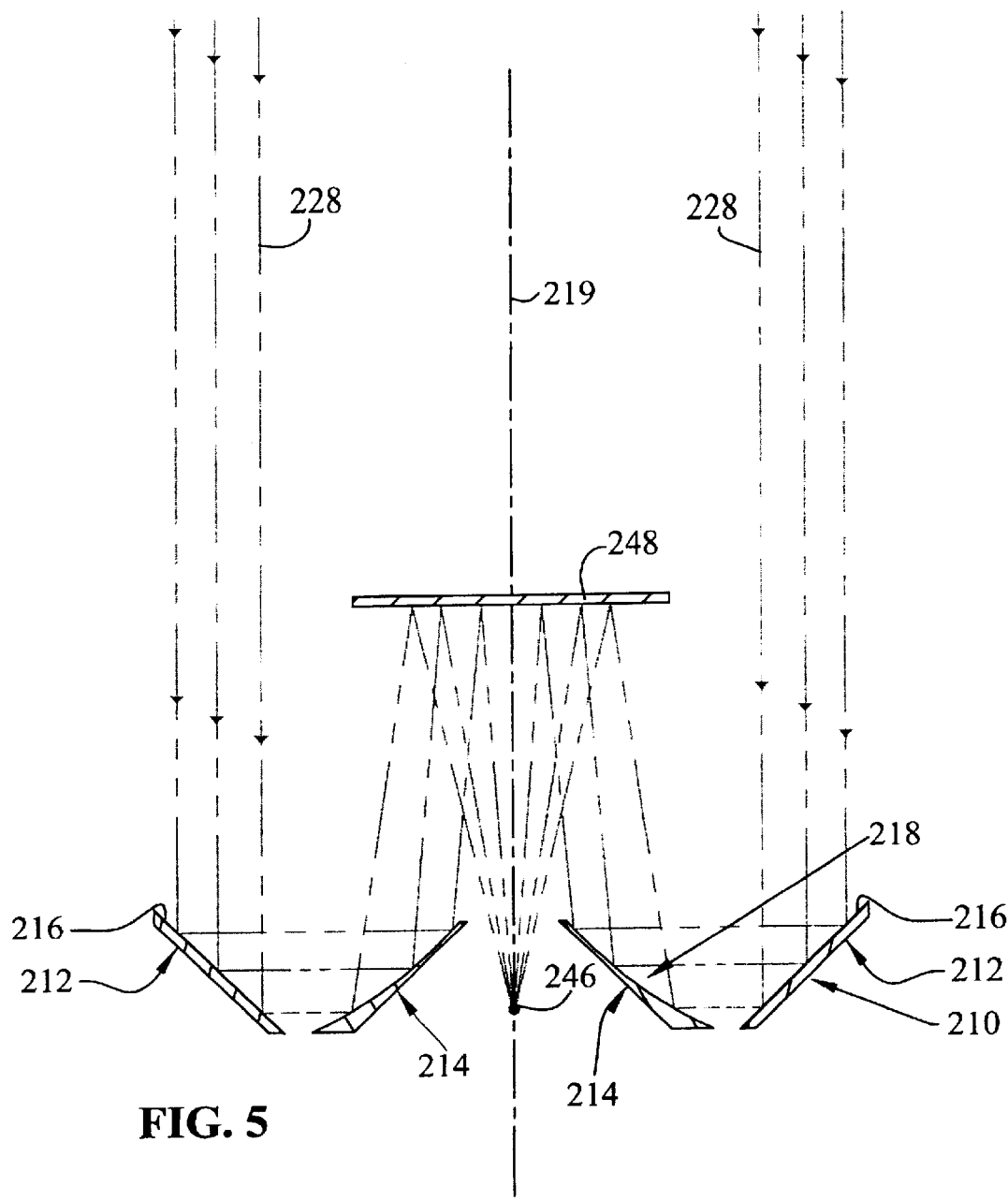
FIG. 5 is a cross section of yet another self-standing embodiment of the invention.

Referring now to FIG. 5, another embodiment of a light-gathering device 210 that is capable of being used as a stand alone telescope is shown. This embodiment differs from the previous embodiment in that it includes a pair of frustums 212 and 214 orientated in opposing directions. Light-gathering device 210 also includes an inner reflective surface 216 on outer frustum 212 and an outer reflective surface 218 on inner frustum 214. Frustums 212, 214 are aligned along a common central axis 219. In this embodiment, light rays 229 are reflected from the frustums to a focal point 246 after reflecting off of an auxiliary flat or curved mirror 248. The housing and frame are not shown in this embodiment for simplicity.

Outer frustum 212 is orientated similar to outer frustums 12 and 112, wherein light rays 229 enter from the base in a direction substantially parallel to the central axis 219. Light rays 229 reflect off an inner reflecting surface 216 and travel perpendicularly toward the central axis 219 of frustums 212, 214. The light rays then reflect off of outer reflecting surface 218, which is a parabolic mirror in this embodiment, and travel in a direction substantially opposite incoming light rays 229 toward a focal point. Auxiliary mirror 248 intercepts the light rays 229 before they completely converge and reflects the light rays 229 back toward frustums 212, 214 to focal point 246. To intercept the converging light rays 229 reflected off the parabolic outer reflecting surface 218 of inverted inner frustum 214, the auxiliary mirror 248 is positioned above the frustums 212, 214 closer toward the light source. However, since the light rays are converging, they will continue to converge to focal point 246 even if auxiliary mirror 248 is flat. As is well known to one versed in the art, a magnifying lens (not shown) may be used to magnify the light rays 229 at the focal point 246 such that the light gathered may be viewed by the human eye.

The light-gathering device of FIG. 5 is more compact than the embodiment shown in FIG. 4. The use of the reflecting mirror 248 and inverted inner frustum 214 allows the focal point 246 to be closer to the frustums 212, 214 than can be achieved with the embodiment of FIG. 4. However, for this to be achieved, the auxiliary mirror 248 must be utilized, increasing the number of components of the invention.

Figure 6:
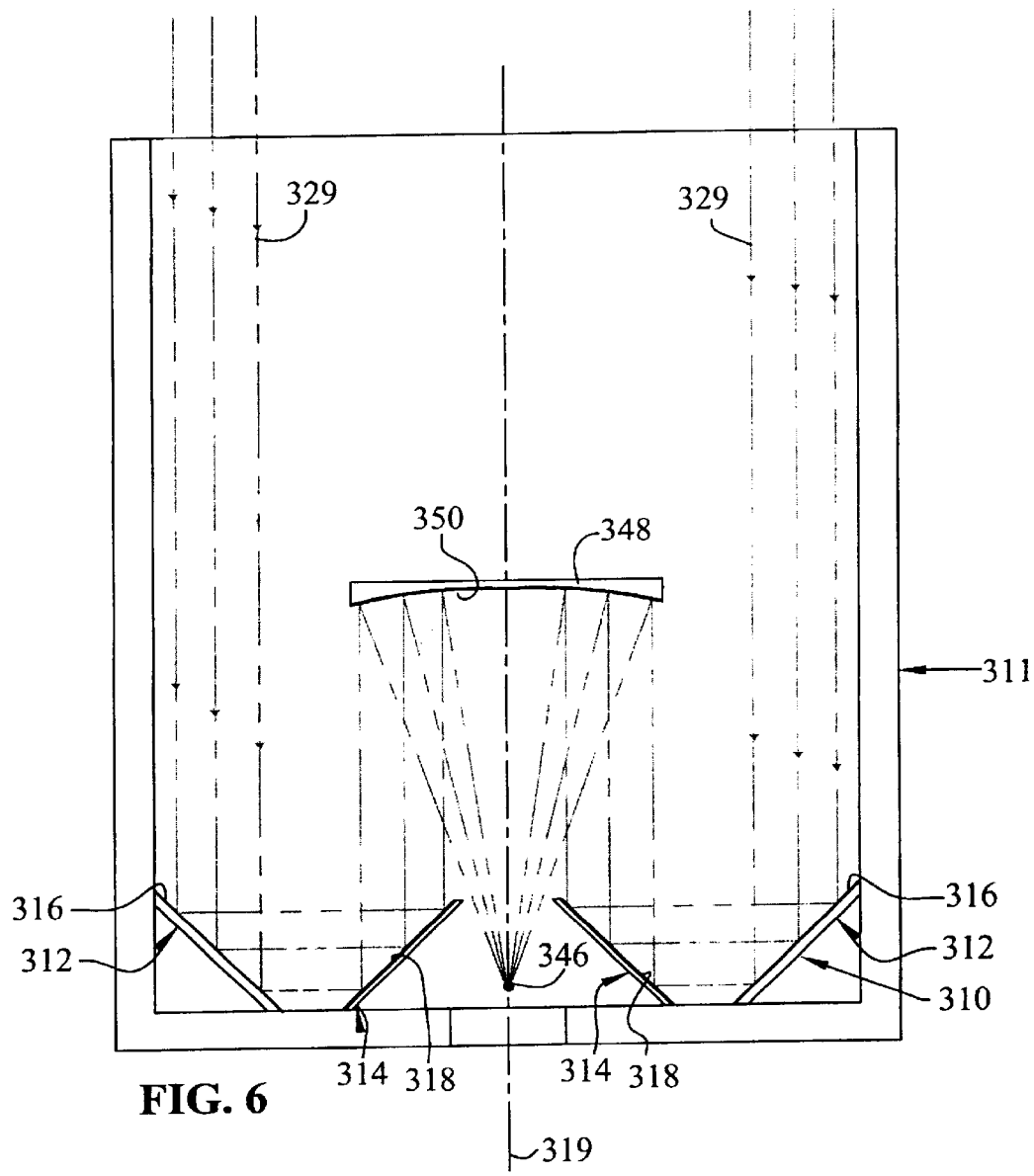
FIG. 6 is a section of still another embodiment of a self-standing light-gathering device.

Referring to FIG. 6, another stand-alone light-gathering device 310, similar to that disclosed in FIG. 5, is shown in a housing generally indicated as 311. Light-gathering device 310 includes an outer frustum 312, an inner inverted frustum 314 having reflective surfaces 316, 318, respectively. Frustums 312, 314, like the other embodiments depicted, are aligned along a common central axis 319. Light rays 329 entering light-gathering device 310 are reflected toward a focal point 346 off of an auxiliary mirror 348 having a parabolic surface 350.

In this embodiment, light rays 329 reflect off inner reflecting surface 316 of outer frustum 312 and then reflect off outer reflecting surface 318 of inner frustum 314 such that the light rays are traveling in the opposite direction, but substantially parallel, to the direction the light rays were traveling upon entering the light-gathering device 310. Auxiliary mirror 348 is located in a position so that parabolic surface 350 intercepts the light rays. The light rays reflect off of the parabolic surface 350 and converge at focal point 346, where one skilled in the art could utilize an eyepiece or a magnifying lens (not shown) in order to view the image gathered by the light-gathering device 310.

The above-described embodiments illustrate representative examples of the invention; however, one skilled in the art will appreciate that changes can be made in form and detail without departing from the spirit and scope of the invention. For example, although most of the embodiments shown utilize frustums having reflective surfaces inclined at 45° from the axis, it is possible to use other angles of inclination. However, it is believed that having the reflective surfaces at a 45° inclination is the most efficient for light gathering. Furthermore, if the outer frustum reflecting surface is at another angle, the rays will not reflect in a direction perpendicular to the central axis. Also, the reflecting surfaces of the frustums must be parallel to one another if it is desired to have the light rays exit the funneling opening in a direction parallel to the central axis.

It is also possible that the inner and outer frustums may be substituted with a frustum-shaped light transparent block having an outer angled reflective surface and a central aperture defined by an inner angled reflective surface. However, this would not offer the weight savings and sectionability of the embodiments shown.

Furthermore, the apex of the inner frustum may be brought to a point as a complete cone in any of the embodiments without affecting the functionality of the light-gathering device. Also, it will be recognized by one skilled in the art that the larger the diameter of the outer frustum, the greater the light-collecting ability will be of the light-gathering device. Therefore, the diameter and amount of light collected by the light-gathering device are only limited by the practical considerations in maintaining sufficient uniformity and rigidity of the frustum as the size is increased. Therefore, the invention is not limited by the above-described embodiments or figures, but rather by the following claims.

I claim:

1. A light-gathering device for concentrating light comprising an outer frustum-shaped mirror and an inner frustum-shaped mirror, said mirrors being situated along a common central axis, said outer frustum-shaped mirror having an inner reflecting surface and the inner frustum-shaped mirror having an outer reflecting surface, whereby light rays traveling substantially parallel to said central axis reflect off said inner reflecting surface toward said central axis, the light rays being intercepted by said outer reflecting surface and reflecting in a direction substantially parallel to said central axis.

2. The light-gathering device set forth in claim 1, wherein said outer reflecting surface and said inner reflecting surface are substantially parallel.

3. The light-gathering device set forth in claim 2, wherein an angle of approximately 45° degrees is formed between said central axis and said inner reflecting surface, whereby the light rays being reflected off of said inner reflecting surface reflect substantially perpendicular toward the central axis.

4. The light-gathering device set forth in claim 3, wherein the light-gathering device is affixed to a telescope having a light-receiving aperture, whereby the light-gathering device increases the amount of light received in the aperture of the telescope.

5. The light-gathering device set forth in claim 1, further including a thin layer of mirrored glass bonded to said inner reflecting surface and said outer reflecting surface to enhance the ability of both the reflecting surfaces to reflect light.

6. The light-gathering device set forth in claim 1, further including a frame, said frame connecting and increasing the rigidity of said outer and said inner conical frustum-shaped mirrors.

7. A light-gathering device as set forth in claim 1, wherein said outer frustum-shaped mirror and said inner frustum-shaped mirror define an outer light collecting opening for receipt of light rays and a funneling opening where concentrated light rays exit said light-gathering device.

8. The light-gathering device as set forth in claim 7, wherein said outer light collecting opening is located at the base of said outer frustum-shaped mirror and said funneling opening is located at the apex thereof.

9. The light-gathering device as set forth in claim 1, wherein said inner frustum-shaped mirror is located within said outer frustum-shaped mirror.

10. The light-gathering device as set forth in claim 1, wherein said inner and outer frustum-shaped mirrors each have a base and said base of said inner frustum-shaped mirror is inverted from said base of the outer frustum-shaped mirror.

11. The light-gathering device as set forth in claim 10 further including an auxiliary parabolic mirror for reflecting the light rays to a focal point.

12. The light-gathering device as set forth in claim 1 further including sectioning lines in at least one of said frustrums for sectioning said frustum during transportation.

13. A light-gathering device for gathering light comprising an outer frustum-shaped mirror and an inner substantially frustum-shaped mirror, said mirrors being situated along a common central axis, said outer frustum-shaped mirror having an inner reflecting surface and said inner frustum-shaped mirror having an outer parabolic reflective surface, whereby light rays traveling substantially parallel to said central axis reflect off said inner reflecting surface toward said central axis, the light rays being intercepted by said parabolic reflective surface and focused toward a focal point.

14. The light-gathering device set forth in claim 13, including an eyepiece, said eyepiece being located between the focal point and said inner frustum-shaped mirror whereby said eyepiece magnifies the light rays reflected by the inner frustum-shaped mirror.

15. The light-gathering device set forth in claim 13, wherein said inner frustum-shaped mirror and said outer frustum-shaped mirror are orientated in opposite directions along said central axis.

16. The light-gathering device set forth in claim 15, further including an auxiliary mirror, whereby said auxiliary mirror reflects the light rays to a focal point in front of said auxiliary mirror.

17. The light-gathering device set forth in claim 16, wherein the focal point is along said central axes.

18. The light-gathering device set forth in claim 17, wherein the focal point is located between the ends of the inner frustum-shaped mirror.

19. A light-gathering device for concentrating light comprising a generally outer frustum-shaped mirror and a generally conical inner mirror, said mirrors being situated along a common central axis, said mirrors defining an outer light-collecting opening between bases on said outer frustum-shaped mirror and said inner conical mirror, and said mirrors defining a funneling opening at the apex of said frustum-shaped mirror, where gathered light received in said outer light-collecting opening exits said light-gathering device in a concentrated manner, said outer frustum-shaped mirror includes an inner reflecting surface, and said inner conical mirror includes an outer reflecting surface and said outer reflecting surface having a parabolic shape, and light rays entering said outer light collecting opening are reflected off said inner reflecting surface to said outer reflecting surface and reflected off said outer reflecting surface toward a focal point.

20. The light-gathering device set forth in claim 19, wherein said inner reflecting surface and said outer reflecting surface are substantially parallel to one another, and light rays entering the outer light collecting opening substantially parallel to said central axis exit said funneling opening substantially parallel to said central axis.

* * * * *